United States Patent [19]

Huang

[11] Patent Number: 5,490,213
[45] Date of Patent: Feb. 6, 1996

[54] APPARATUS FOR HANDS-FREE OPERATION OF A MOBILE TELEPHONE UNIT IN A CAR

[76] Inventor: Lin-Wei Huang, No. 17, Lane 19, Hsin-Chung-I St., Chung-Li City, Tao-Yuan City, Taiwan

[21] Appl. No.: 345,932

[22] Filed: Nov. 28, 1994

[51] Int. Cl.⁶ ............................................. H04M 1/00
[52] U.S. Cl. .................... 379/442; 379/420; 379/426; 379/454; 379/455
[58] Field of Search ............................... 379/442, 426, 379/454, 455, 420, 441

[56] References Cited

U.S. PATENT DOCUMENTS 5,313,514  5/1994  Kanasashi .................... 379/406

*Primary Examiner*—Jeffery A. Hofsass
*Assistant Examiner*—Jack Chiang
*Attorney, Agent, or Firm*—Ladas & Parry

[57] ABSTRACT

An apparatus for permitting hands-free operation of a mobile telephone unit in a car includes a wireless microphone transmitter for generating wireless outgoing signals corresponding to sounds picked up in the passenger room of a car, and a main terminal which has a terminal housing with one end adapted to be inserted into a cigarette lighter socket of the car. A receiver circuit is disposed in the terminal housing and is capable of receiving the wireless outgoing signals from the transmitter. A telephone connector is adapted to be connected electrically to the mobile telephone unit and enables the mobile telephone unit to receive the wireless outgoing signals from the receiver circuit and transmit wirelessly the wireless outgoing signals. Wireless incoming signals received by the mobile telephone unit are received by a loudspeaker in the terminal housing. The loudspeaker generates an acoustic output corresponding to the wireless incoming signals. A set of electrical contacts on the one end of the terminal housing connects electrically the receiver circuit and the loudspeaker to a car battery of the car via the cigarette lighter socket.

4 Claims, 7 Drawing Sheets

APPARATUS FOR HANDS-FREE OPERATION OF A MOBILE TELEPHONE UNIT IN A CAR

BACKGROUND OF THE INVENTION

1. Field of the Invention

The invention relates to a mobile telephone unit, more particularly to an apparatus which permits hands-free operation of a mobile telephone unit in a car.

2. Description of the Related Art

It is known that driving while holding a mobile telephone unit on one hand can increase the risk of vehicular accidents. FIG. 1 illustrates a known apparatus 10 which permits hand-free operation of a mobile telephone unit (T) in a car, thereby permitting the driver of the car to drive and use the mobile telephone unit (T) at the same time. The apparatus 10 comprises a main terminal 11, a plug 12 adapted to be inserted into a cigarette lighter socket of a car, a microphone 13, a loudspeaker 14 and a telephone connector 15. The main terminal 11 is to be secured within the passenger room of the car. The plug 12 is connected to the main terminal 11 via an electrical cable 121 and serves to connect electrically the main terminal 11 to the car battery, thereby providing electrical power to the apparatus 10. The telephone connector 15 is connected to the main terminal 11 via an electrical cable 151 and serves to connect electrically the mobile telephone unit (T) to the main terminal 11 so that wireless incoming signals received by the mobile telephone unit (T) can be received by the main terminal 11 and so that wireless outgoing signals from the main terminal 11 can be sent to the mobile telephone unit (T) so as to be transmitted wirelessly by the latter. The loudspeaker 14 is disposed outside the housing of the main terminal 11 and is connected electrically to the main terminal 11 via an electrical cable 141. The main terminal 11 enables the loudspeaker 14 to generate an acoustic output corresponding to the wireless incoming signals from the mobile telephone unit (T). The microphone 13 is connected electrically to the main terminal 11 via an electrical cable 131 and supplies to the main terminal 11 the wireless outgoing signals that are to be provided to the mobile telephone unit (T). Since it is necessary for the microphone 13 to pick up sounds coming from the mouth of the driver, the microphone 13 is typically installed on the driver's clothing or at a sun visor adjacent to the roof of the car.

The drawbacks of the conventional apparatus 10 are as follows:

1. The conventional apparatus 10 is inconvenient to install. It is difficult to mount the main terminal 11 within the passenger room of the car at a position in front of the driver because of crowded conditions thereat. In addition, the various electrical cables 121, 131, 141 which interconnect the plug 12, the microphone 13 and the loudspeaker 14 to the main terminal 11 are an eyesore because they cannot be conveniently concealed.

2. If the microphone 13 is installed at the roof of a car, reception is likely to be relatively poor since the microphone 13 easily picks up noise and other interference. The quality of the sound picked up by the microphone 13 is enhanced when the latter is installed on the driver's clothing. However, the range of movement of the driver is severely limited by the electrical cable 131 which connects the microphone 13 to the main terminal 11. In addition, the electrical cable 131 is always subjected to tension, thereby affecting adversely the service life of the same.

SUMMARY OF THE INVENTION

Therefore, the object of the present invention is to provide an apparatus for permitting hands-free operation of a mobile telephone unit in a car which can overcome the drawbacks that are commonly associated with the prior art.

Particularly, the object of the present invention is to provide an apparatus for permitting hands-free operation of a mobile telephone unit in a car which employs a fewer number of electrical cables and which makes use of a wireless microphone system to overcome the previously mentioned drawbacks.

According to the present invention, an apparatus for permitting hands-free operation of a mobile telephone unit in a car comprises a wireless microphone transmitter, to be disposed in a passenger room of the car, for generating wireless outgoing signals corresponding to sounds picked up in the passenger room, and a main terminal. The main terminal includes: a terminal housing to be disposed in the passenger room, the terminal housing confining a receiving space and having one end adapted to be inserted into a cigarette lighter socket of the car; a circuit board mounted in the receiving space; a receiver circuit mounted on the circuit board and capable of receiving the wireless outgoing signals from the transmitter; a connector unit including an electrical cable having one end connected electrically to the receiver circuit and an opposite end extending out of the terminal housing, and a telephone connector connected electrically to the opposite end of the electrical cable and adapted to be connected electrically to the mobile telephone unit to enable the mobile telephone unit to receive the wireless outgoing signals from the receiver circuit and transmit wirelessly the wireless outgoing signals; a loudspeaker mounted on the circuit board and connected electrically to the one end of the electrical cable, wireless incoming signals received by the mobile telephone unit being received by the loudspeaker via the electrical cable, the loudspeaker generating an acoustic output corresponding to the wireless incoming signals; and a set of electrical contacts provided on the one end of the terminal housing and connected electrically to the receiver circuit and the loudspeaker, the electrical contacts being adapted to connect electrically the receiver circuit and the loudspeaker to a car battery of the car via the cigarette lighter socket so as to permit supply of electric power to the receiver circuit and the loudspeaker.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
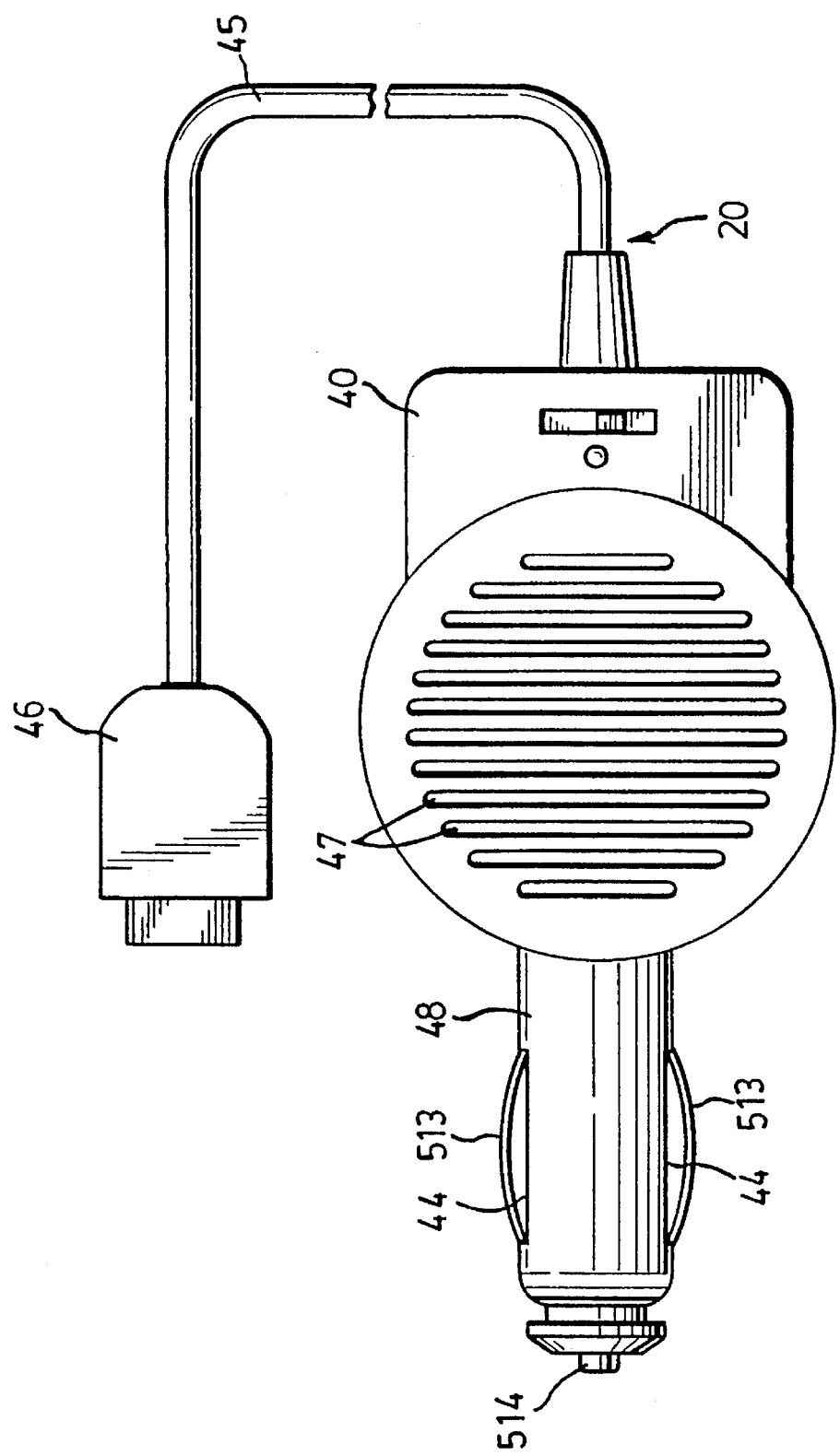
FIG. 3 is a top view of the main terminal shown in FIG. 2 illustrating its assembly.
Figure 5:
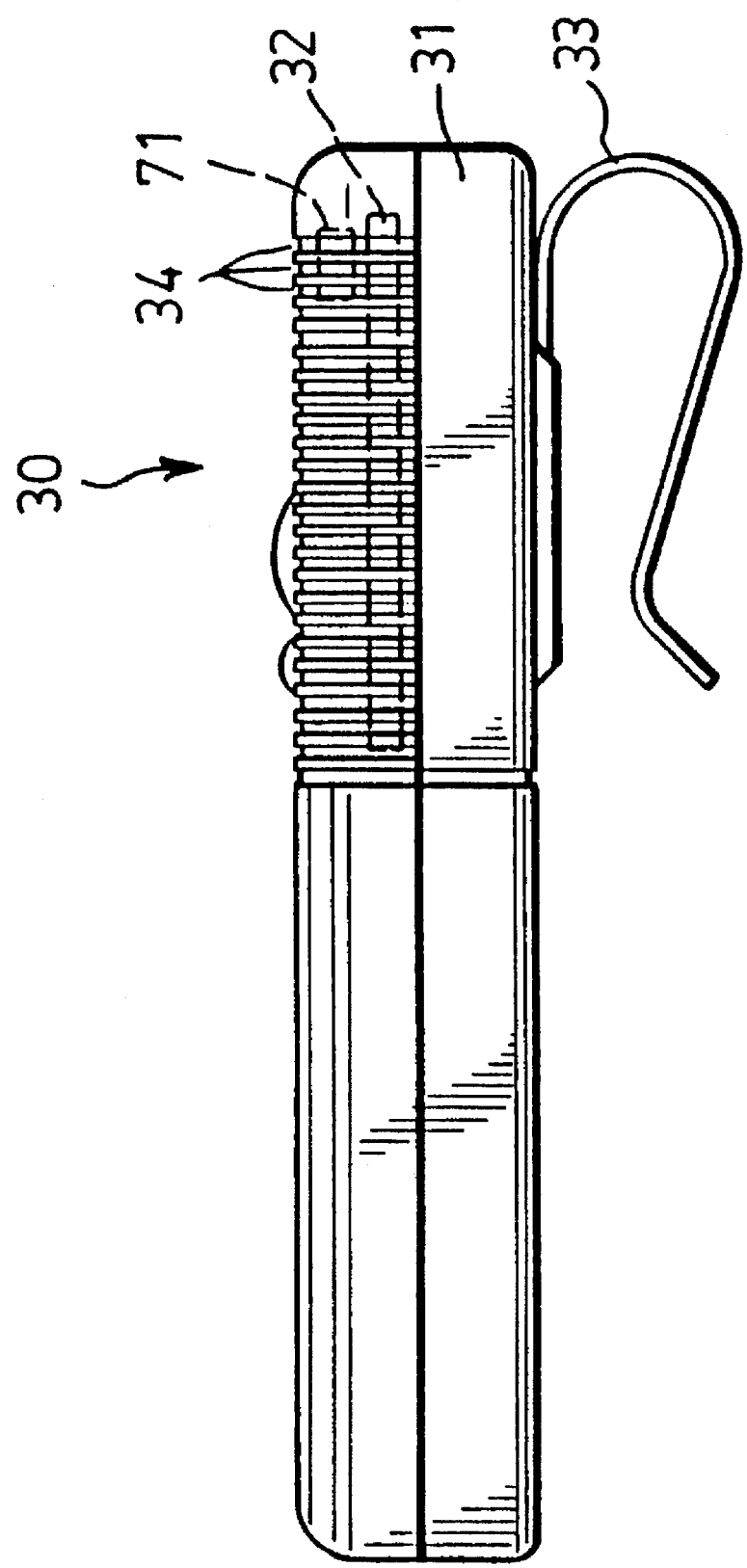
FIG. 5 is a schematic side view of a wireless microphone transmitter of the preferred embodiment.

Referring to FIGS. 3 and 5, the preferred embodiment of an apparatus for hands-free operation of a mobile telephone unit according to the present invention is shown to comprise a wireless microphone transmitter 30 for generating wireless outgoing signals corresponding to sounds picked up in a passenger room of a car, and a main terminal 20.

Figure 1:
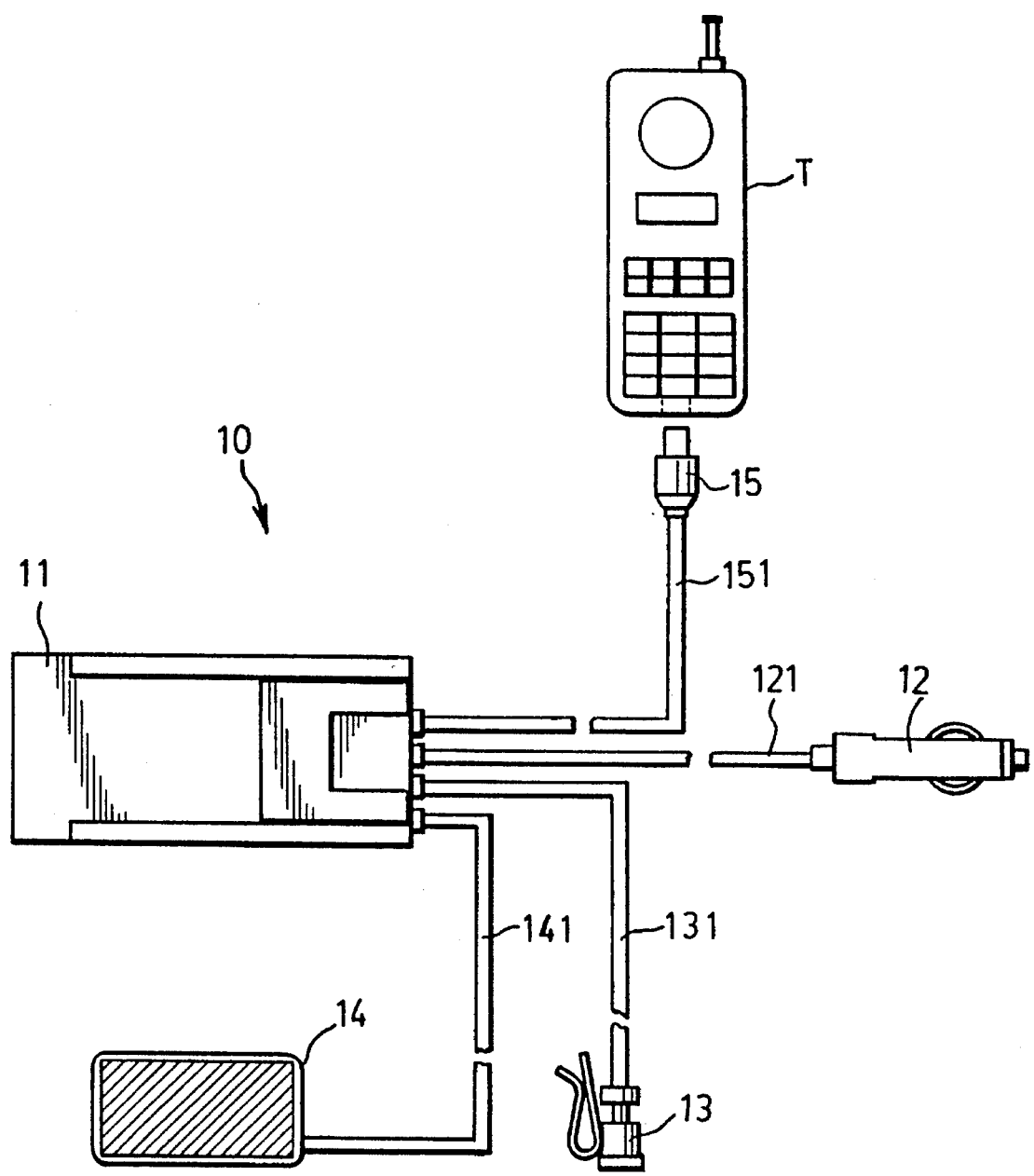
FIG. 1 illustrates a conventional apparatus for hands-free operation of a mobile telephone unit.
Figure 2:
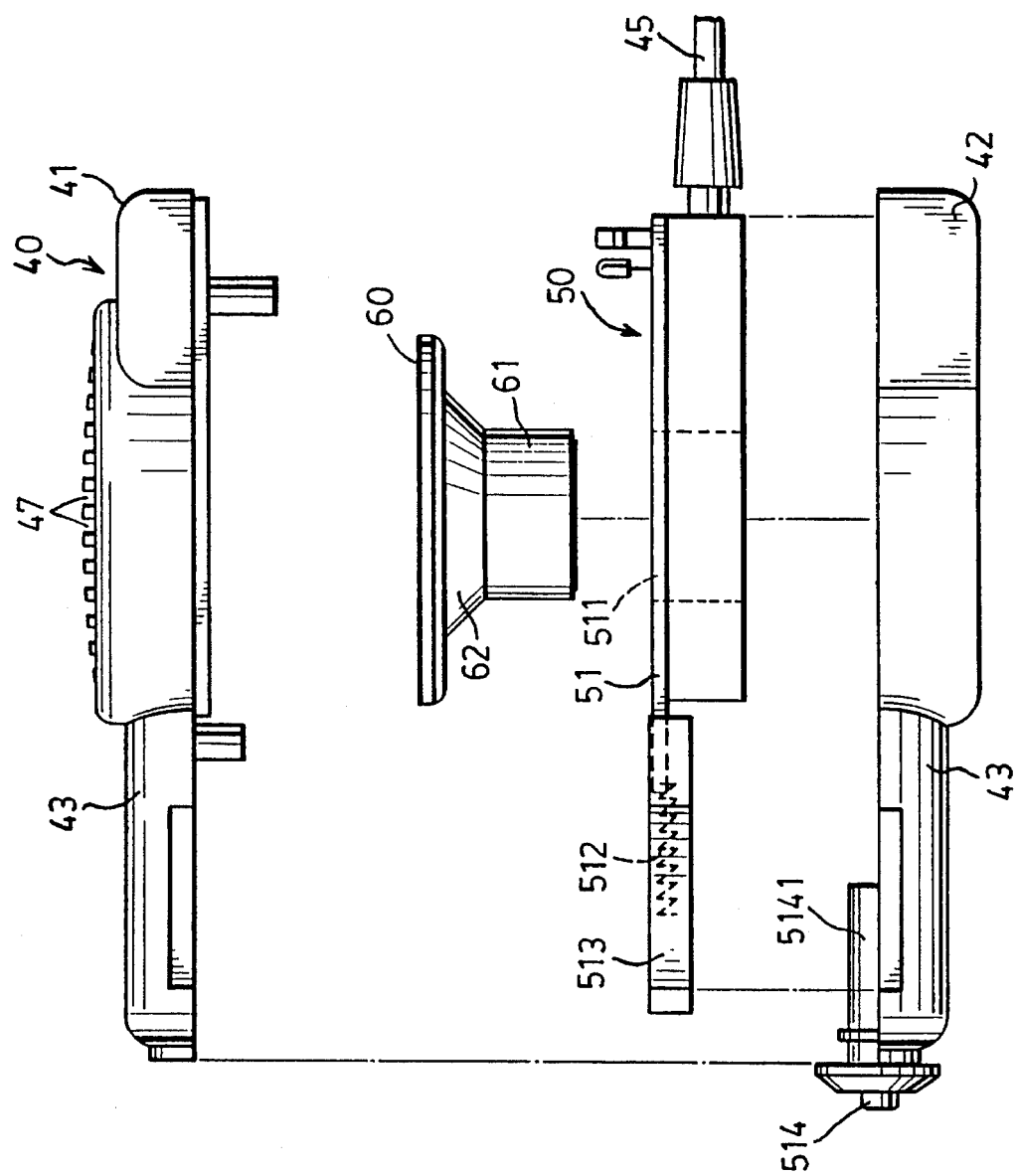
FIG. 2 is a schematic exploded view of a main terminal of the preferred embodiment of an apparatus for hands-free operation of a mobile telephone unit according to the present invention.
Figure 4:
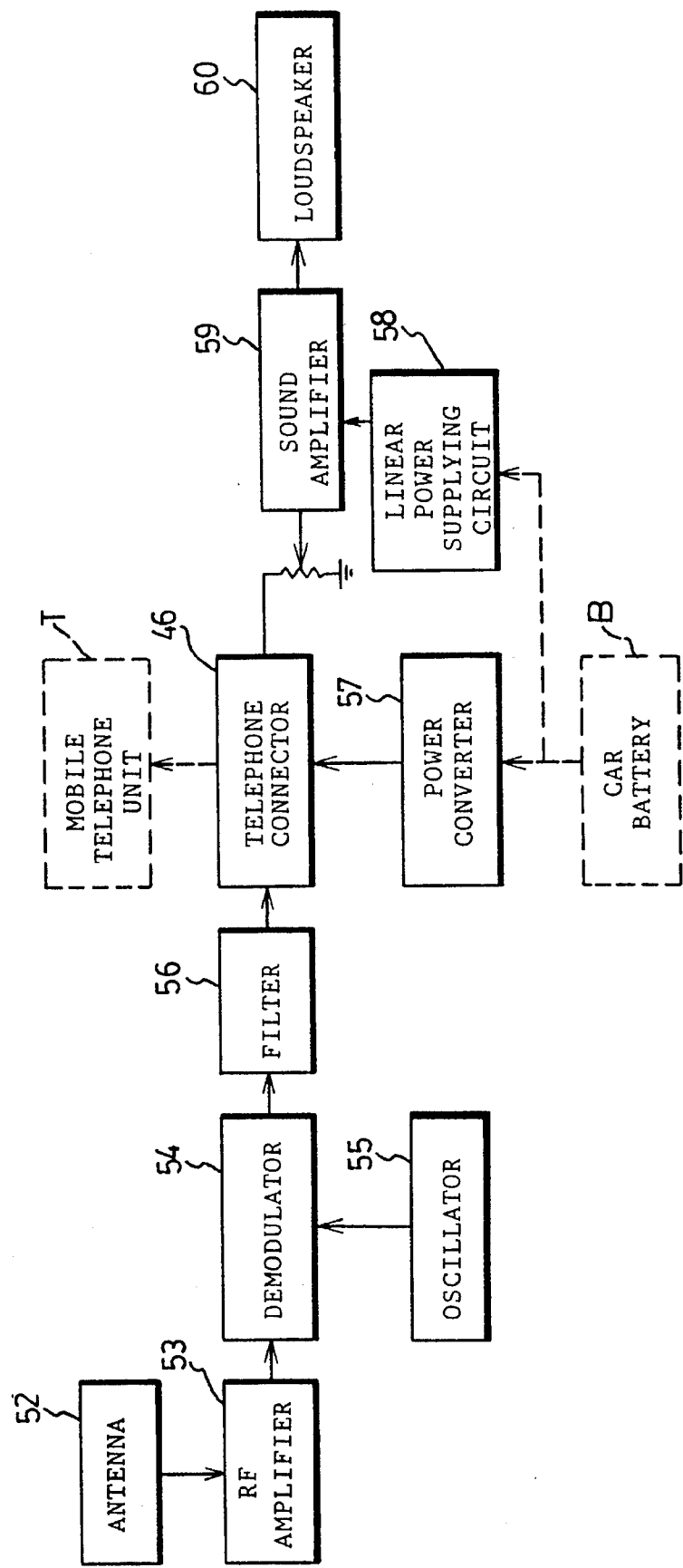
FIG. 4 is a schematic circuit block diagram of the main terminal shown in FIG. 2.

Referring to FIGS. 2 to 4, the main terminal 20 includes a terminal housing 40 and a terminal circuit unit 50. The terminal housing 40 includes first and second housing halves 41, 42 which cooperatively confine a receiving space therein. Each of the first and second housing halves 41, 42 has a forward extension 43 formed with a pair of notches 44 at opposite longitudinal sides thereof. The forward extensions 43 cooperatively form a tubular housing part 48 that is adapted to be inserted into a cigarette lighter socket of the car. A printed circuit board 51 is mounted in the receiving space of the terminal housing 40. The terminal circuit unit 50 is mounted on the circuit board 51 and comprises a known receiver circuit which includes an antenna 52, a radio-frequency (RF) amplifier 53, a demodulator 54, an oscillator 55 and a filter 56. The receiver circuit is capable of receiving the wireless outgoing signals from the transmitter 30 shown in FIG. 5.

A connector unit includes an electrical cable 45 having one end connected electrically to the receiver circuit and an opposite end extending out of the terminal housing 40, and a telephone connector 46 connected electrically to the opposite end of the electrical cable 45. The telephone connector 46 is adapted to be connected electrically to a mobile telephone unit (T) to enable the latter to receive the wireless outgoing signals from the receiver circuit and transmit wirelessly the wireless outgoing signals.

The terminal circuit unit 50 further comprises a sound amplifier 59 and a loudspeaker 60. The circuit board 51 is formed with a mounting hole 511 therethrough. The loudspeaker 60 has a magnet portion 61 which is secured in the mounting hole 511, and a cone portion 62. The first housing half 41 is formed with a plurality of air holes 47 adjacent to the cone portion 62. The sound amplifier 59 connects electrically the loudspeaker 60 to the electrical cable 45. Thus, wireless incoming signals from the mobile telephone unit (T) can be received by the loudspeaker 60 so that the latter can generate an acoustic output corresponding to the wireless incoming signals. The air holes 47 permit the acoustic output of the loudspeaker 60 to be heard by the driver of the car.

The terminal circuit unit 50 additionally comprises a power converter 57 and a linear power supplying circuit 58 connected electrically to the receiver circuit and the loudspeaker 60. The power converter 57 and the linear power supplying circuit 58 are connected electrically to a set of electrical contacts 513, 514 provided on the tubular housing part 48. The electrical contacts 513, 514 serve to connect electrically the power converter 57 and the linear power supplying circuit 58 to a car battery (B) via the cigarette lighter socket, thus permitting the supply of electric power to the different circuit components of the terminal circuit unit 50.

The electrical contacts include a pair of resilient first contacts 513 formed as a pair of curved strips that are to be secured to the tubular housing part 48 at one end and that are connected to the circuit board 51 at the other end, and a spring-loaded second contact 514 that is disposed axially in the tubular housing part 48 between the first contacts 513 and that extends through a tip of the tubular housing part 48. A conductive coil spring 512 has one end connected to the circuit board 51 and the other end connected electrically to the second contact 514. The coil spring 512 biases the second contact 514 away from the circuit board 51. A fuse 5141 may be interposed between the second contact 514 and the coil spring 512 to prevent damage to the terminal circuit unit 50 due to excessive current from the car battery (B).

Figure 6:
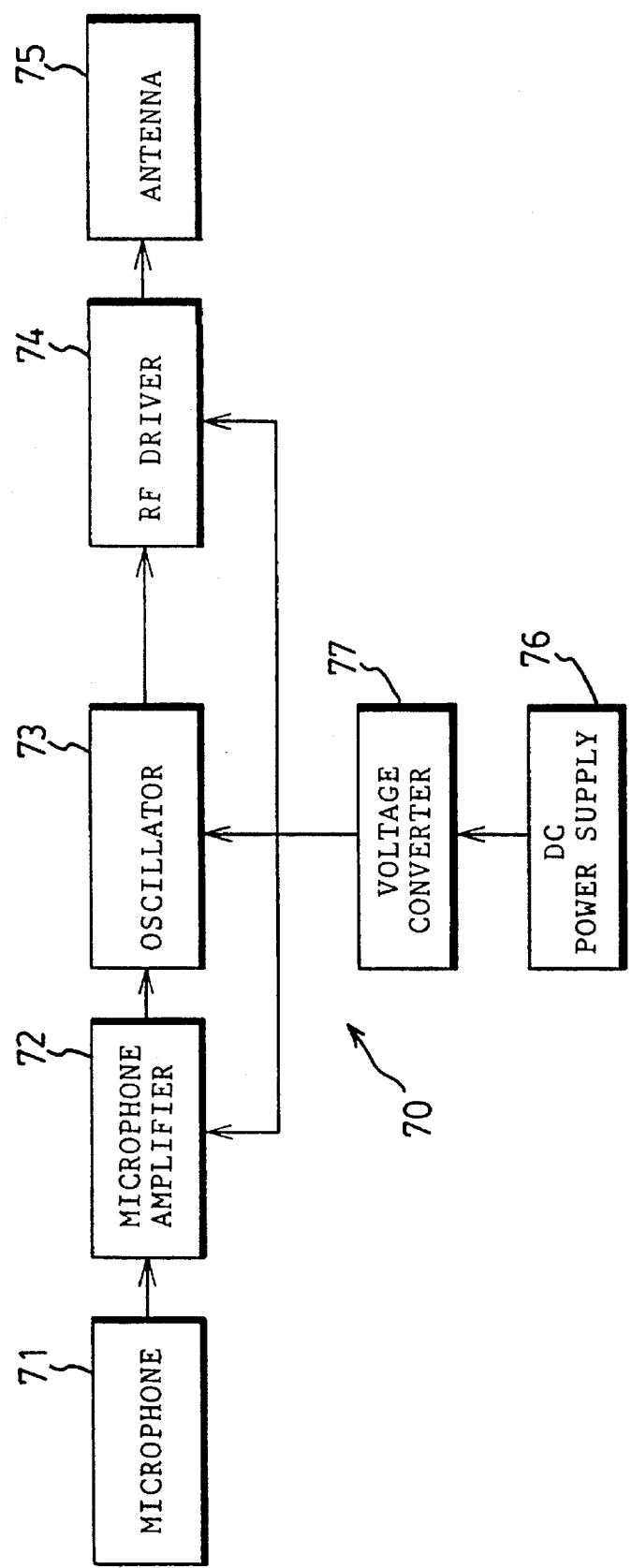
FIG. 6 is a schematic circuit block diagram of the wireless microphone transmitter shown in FIG. 6.

Referring to FIGS. 5 and 6, the wireless microphone transmitter 30 includes a transmitter casing 31, a circuit board 32 mounted in the transmitter casing 31, a known transmitter circuit 70 mounted on the circuit board 32, and a microphone 71 disposed in the transmitter casing 31 and connected electrically to the transmitter circuit 70. The transmitter casing 31 is provided with a clip 33 to permit securing of the transmitter 30 at a desired location. The transmitter circuit 70 includes a microphone amplifier 72, an oscillator 73, a radio-frequency (RF) driver 74, an antenna 75, a DC power supply 76, such as a plurality of battery cells, and a voltage converter 77. The transmitter casing 31 is formed with a plurality of air holes 34 to enable the microphone 71 to pick up sounds easily. The power supply 76 ensures proper operation of the transmitter circuit 70. In operation, the microphone 71 generates wireless outgoing signals corresponding to sounds picked up thereby, and the transmitter circuit 70 transmits wirelessly the wireless outgoing signals for reception by the main terminal 20.

Figure 7:
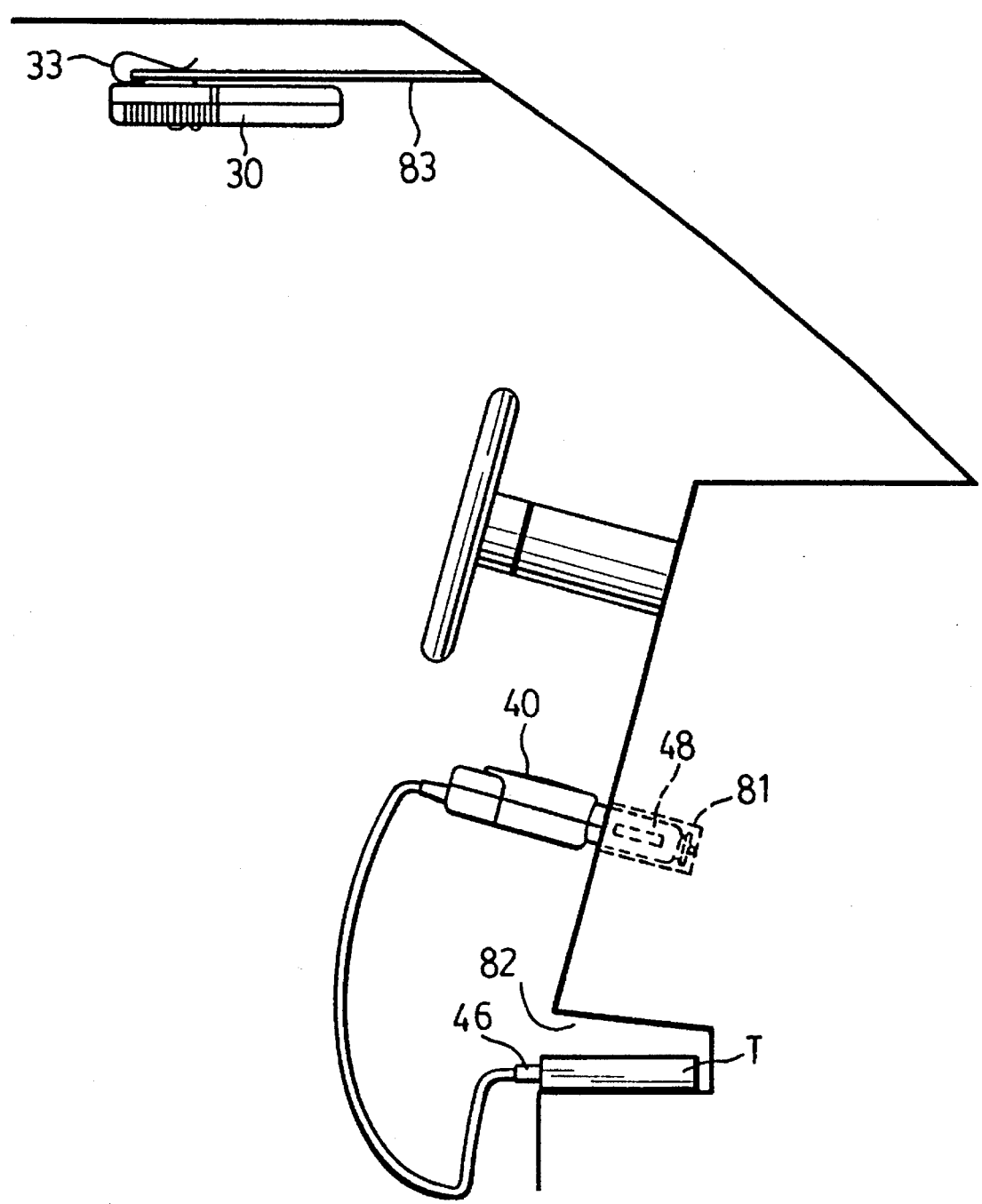
FIG. 7 illustrates the preferred embodiment when installed in the passenger room of a car.

FIG. 7 illustrates the preferred embodiment when installed in the passenger room of a car. As shown, the tubular housing part 48 of the terminal housing 40 is inserted into a cigarette lighter socket 81. The telephone connector 46 is connected to the mobile telephone unit (T), which may be placed in a compartment 82 below the instrument panel. With the use of the clip 33, the transmitter 30 may be secured to a sun visor 83 adjacent to the roof of the car. Alternatively, the transmitter 30 may be secured on the driver's clothes, such as on a shirt pocket.

The advantages and characterizing features of the present invention are as follows:

1. The present invention is compact and easy to install since the main terminal, the loudspeaker and the plug of the conventional apparatus were integrated in the main terminal of the apparatus of this invention. In addition, the terminal housing can be inserted directly into the cigarette lighter socket to supply power to the main terminal.

2. The electrical cables for connecting the plug, the microphone and the loudspeaker to the main terminal of the conventional apparatus are eliminated in the apparatus of this invention since the plug and the loudspeaker were integrated in the main terminal of the latter and since a wireless microphone system is employed.

3. The wireless microphone transmitter, which can be secured to a selected location within the passenger room of the car, does not limit the range of movement of the driver.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An apparatus for permitting hands-free operation of a mobile telephone unit in a car, comprising:

a wireless microphone transmitter, to be disposed in a passenger room of the car, for generating wireless outgoing signals corresponding to sounds picked up in the passenger room; and a main terminal including: a terminal housing to be disposed in the passenger room, said terminal housing confining a receiving space and having one end adapted to be inserted into a cigarette lighter socket of the car; a circuit board mounted in said receiving space; a receiver circuit mounted on said circuit board and capable of receiving said wireless outgoing signals from said transmitter; a connector unit including an electrical cable having one end connected electrically to said receiver circuit and an opposite end extending out of said terminal housing, and a telephone connector connected electrically to said opposite end of said electrical cable and adapted to be connected electrically to the mobile telephone unit to enable the mobile telephone unit to receive said wireless outgoing signals from said receiver circuit and transmit wirelessly said wireless outgoing signals; a loudspeaker mounted on said circuit board and connected electrically to said one end of said electrical cable, wireless incoming signals received by the mobile telephone unit being received by said loudspeaker via said electrical cable, said loudspeaker generating an acoustic output corresponding to the wireless incoming signals; and a set of electrical contacts provided on said one end of said terminal housing and connected electrically to said receiver circuit and said loudspeaker, said electrical contacts being adapted to connect electrically said receiver circuit and said loudspeaker to a car battery of the car via the cigarette lighter socket so as to permit supply of electric power to said receiver circuit and said loudspeaker.

2. The apparatus as claimed in claim 1, wherein said one end of said terminal housing is formed as a tubular housing part with a pair of longitudinally extending notches, said electrical contacts including a pair of resilient first contacts formed as a pair of curved strips that are secured to said tubular housing part and that extend respectively out of said notches, and a spring-loaded second contact that is disposed axially in said tubular housing part between said first contacts and that extends through a tip of said tubular housing part.

3. The apparatus as claimed in claim 1, wherein said circuit board is formed with a mounting hole, said loudspeaker having a magnet portion secured in said mounting hole and a cone portion, said terminal housing being formed with a plurality of air holes adjacent said cone portion to permit said acoustic output to be heard by a person in the passenger room.

4. The apparatus as claimed in claim 1, wherein said transmitter comprises a transmitter casing formed with a plurality of air holes and provided with a clip, a microphone disposed in said transmitter casing for generating said wireless outgoing signals, and a transmitter circuit disposed in said transmitter casing and connected electrically to said microphone, said transmitter circuit transmitting wirelessly said wireless outgoing signals.

* * * * *